(12) United States Patent
Sui et al.

(10) Patent No.: US 12,130,599 B2
(45) Date of Patent: Oct. 29, 2024

(54) DIGITAL AND INTELLIGENT OPERATION AND MAINTENANCE SYSTEM FOR TAILINGS POND

(71) Applicants: Kunming Prospecting Design Institute Of China Nonferrous Metals Industry Co., Ltd, Kunming (CN); Beijing Leading Software Co., Ltd., Beijing (CN)

(72) Inventors: Sugang Sui, Kunming (CN); Guofu Zou, Kunming (CN); Wenlian Liu, Kunming (CN); Peng Li, Kunming (CN); Xining Sun, Kunming (CN)

(73) Assignees: Kunming Prospecting Design Institute Of China Nonferrous Metals Industry Co., Ltd, Kunming (CN); Beijing Leading Software Co., Ltd., Beijing (CN)

( * ) Notice: Subject to any disclaimer, the term of this patent is extended or adjusted under 35 U.S.C. 154(b) by 0 days.

(21) Appl. No.: 18/670,149

(22) Filed: May 21, 2024

(65) Prior Publication Data

US 2024/0310799 A1      Sep. 19, 2024

(30) Foreign Application Priority Data

Feb. 21, 2024   (CN) .................. 202410191102.X (51) Int. Cl.
| | |
|---|---|
| G05B 13/04 | (2006.01) |
| G05B 23/02 | (2006.01) |
| G06F 18/20 | (2023.01) |
| G06N 7/06 | (2006.01) |
| G06Q 10/30 | (2023.01) |
| G06Q 50/02 | (2012.01) |
| G06T 17/05 | (2011.01) |

(Continued)

(52) U.S. Cl.
CPC ........ *G05B 13/048* (2013.01); *G05B 13/042* (2013.01); *G05B 23/027* (2013.01); *G06F 18/20* (2023.01); *G06N 7/06* (2013.01); *G06Q 10/30* (2013.01); *G06Q 50/02* (2013.01); *G06T 17/05* (2013.01); *G08B 21/12* (2013.01); *G08B 31/00* (2013.01)

(58) Field of Classification Search
None
See application file for complete search history.

(56) References Cited

U.S. PATENT DOCUMENTS

| | | |
|---|---|---|
| 2005/0099498 A1 | 5/2005 | Lao et al. |
| 2006/0012683 A9 | 1/2006 | Lao et al. |
| 2018/0233139 A1 | 8/2018 | Finkelstein et al. |

OTHER PUBLICATIONS

CNIPA, Notification of First Office Action for Chinese application CN202410191102.X, Mar. 27, 2024.

(Continued)

*Primary Examiner* — Carlos R Ortiz Rodriguez
(74) *Attorney, Agent, or Firm* — Hemisphere Law, PLLC; Zhigang Ma (57) ABSTRACT

The present disclosure relates to the technical field of geotechnical engineering digitization, and in particular to a digital and intelligent operation and maintenance system for a tailings pond. The present disclosure has a better supplementary effect on the operation and maintenance of the tailings pond, can judge and warn the stability of the dam body and the pollution degree of the surrounding environment during the operation of the tailings dam, and can provide a good tailings discharge mode.

4 Claims, 2 Drawing Sheets

(51) Int. Cl.
*G08B 21/12* (2006.01)
*G08B 31/00* (2006.01)

(56) References Cited

OTHER PUBLICATIONS

CNIPA, Notification to grant patent right for Chinese application CN202410191102.X, Apr. 3, 2024.

DIGITAL AND INTELLIGENT OPERATION AND MAINTENANCE SYSTEM FOR TAILINGS POND

TECHNICAL FIELD

The present disclosure relates to the technical field of geotechnical engineering digitization, and in particular to a digital and intelligent operation and maintenance system for a tailings pond.

BACKGROUND

A tailings pond is a location for storage of tailings and other industrial waste slag during the development process of mineral resources, typically for recycling of mineral components remaining in tailings, and recycling of water resources. The tailings pond acts as a site where the tailings are deposited and treated. The large storage of the tailings gradually destabilizes the dam body structure of the tailings pond and causes rapid debris flow, which results in large scale destruction, and since the tailings usually contain large amounts of heavy metals, the natural environment in the area where the tailings pond is located is often contaminated to a large extent. The operation and maintenance of the tailings pond has great practical significance for mining production and environmental protection.

However, in the operation and maintenance process of the tailings pond, the overall stability check and warning of the dam body, the determination of the pollution degree of the surrounding environment, and the optimization of the accumulation plan during the accumulation process are all completed manually. At present, there is no auxiliary system to replace it. This reduces the operation and maintenance efficiency of the tailings pond, which is not conducive to reducing the potential safety hazards in the operation of the tailings dam and protecting the natural environment around the tailings pond. Therefore, it is necessary to develop an intelligent tailings operation and maintenance system to assist relevant staff to complete the operation and maintenance of the tailings pond.

SUMMARY

In response to the deficiencies in the prior art, the present disclosure provides a digital and intelligent operation and maintenance system for a tailings pond.

In order to achieve the above object, the present disclosure provides a digital and intelligent operation and maintenance system for a tailings pond, the system includes: a data collection module, a data model module, an AI calculation module, a pre-judgment and warning module, an AI optimization module and a data center; the data collection module is configured to collect basic data of a tailings pond construction area, and store the basic data in the data center; the data model module is configured to construct a three-dimensional geological model of the tailings pond construction area and a tailings accumulation body model based on the basic data; the AI calculation module is configured to calculate a pollution level of the tailings pond construction area and stability of the tailings accumulation body on the basis of the data model module; the pre-judgment and warning module is configured to perform pollution warning by using the pollution level, and performs stability warning according to the stability; the AI optimization module is configured to, on the basis of the data model module and the pre-judgment and warning module, analyze and output an optimal discharge mode of the tailings accumulation body according to a set optimized tailings accumulation body model; the data center is configured to receive and store data generated by each module, and realize information sharing between the modules. The present disclosure has a better supplementary effect on the operation and maintenance of the tailings pond, can judge and warn the stability of the dam body and the pollution degree of the surrounding environment during the operation of the tailings dam, and can provide a good tailings discharge mode.

Optionally, the basic data includes topographic and geomorphological data, geological survey data, borehole data, an exploratory line profile, geophysical data, hydrological data, tailings accumulation body data, and environmental data of the tailings pond construction area.

Optionally, the data model module includes:
a two-dimensional borehole generation sub-module, configured to generate two-dimensional borehole data required for constructing the three-dimensional geological model;
a two-dimensional cross-section generation sub-module, configured to generate two-dimensional cross-section data required for constructing the three-dimensional geological model;
a geological plan generation sub-module, configured to generate a geological plan required for constructing the three-dimensional geological model;
a contour data generation sub-module, configured to generate contour data required for constructing the three-dimensional geological model;
a three-dimensional borehole generation sub-module, configured to generate three-dimensional borehole data required for constructing the three-dimensional geological model;
a three-dimensional cross-section generation sub-module, configured to generate three-dimensional cross-section data required for constructing the three-dimensional geological model;
a geological profile generation sub-module, configured to generate a geological three-dimensional profile required for constructing the three-dimensional geological model; and
a geological model generation sub-module, configured to supplement the geological three-dimensional profile according to the borehole data to obtain the three-dimensional geological model,
a tailings accumulation body model generation sub-module, configured to construct the tailings accumulation body model; and
an intermediary sub-module, configured to realize data interaction between other sub-modules of the data model module other than the tailings accumulation body model generation sub-module, thereby realizing data synchronization of two-dimensional data with three-dimensional data.

Further, the intermediary sub-module is used to realize data interaction between other sub-modules of the data model module other than the tailings accumulation body model generation sub-module, thereby realizing low coupling integration between individual sub-modules, simplifying interaction logic between different geological data objects, drastically reducing coupling between different sub-modules, and improving efficiency of constructing a three-dimensional geological model.

Optionally, the geological model generation sub-module includes a first computer storage medium configured to generate the three-dimensional geological model, the first computer storage medium having a first computer program stored therein, and the first computer program executes the following steps when running:

constructing a connected-layer genetic algorithm model configured to determine a connection mode between stratum boundary points revealed by different boreholes; and  supplementing the geological three-dimensional profile according to the connected-layer genetic algorithm model, thereby creating a three-dimensional geological model.

Further, by supplementing the geological three-dimensional profile to create the three-dimensional geological model, the need for gradual correction of the model after its initial formation is avoided, thus improving the modeling efficiency and quality, and realizing the forward construction of the three-dimensional geological model.

Optionally, constructing the connected-layer genetic algorithm model configured to determine the connection mode between the stratum boundary points revealed by the different boreholes includes the following steps:

generating an initial population by randomly generating chromosomes in accordance with all possible connection modes between stratum boundary points;

assessing fitness of each individual in the initial population; and sequentially performing selection, crossover and mutation operations on the population based on the set maximum number of evolutionary iterations and the fitness, and outputting the individual with the maximum fitness.

Optionally, supplementing the geological three-dimensional profile according to the connected-layer genetic algorithm model, thereby creating the three-dimensional geological model includes the following steps:

utilizing a connected-layer genetic algorithm model to obtain an optimal connection mode between stratum boundary points revealed by different boreholes; and  connecting the stratum boundary points revealed by different boreholes according to the optimal connection mode to supplement the geological three-dimensional profile, thereby creating a three-dimensional geological model.

Further, the three-dimensional geological model is improved in accuracy and reliability by finding the optimal connection solution between the stratum boundary points revealed by different boreholes through the connected-layer genetic algorithm model.

Optionally, the AI calculation module includes a second computer storage medium configured to calculate the stability of the tailings accumulation body, the second computer storage medium having a second computer program stored therein, and the second computer program executes the following steps when running:

according to the three-dimensional geological model, the tailings accumulation body model and the basic data, acquiring the stability of the tailings accumulation body by using a FLAC program and a stability calculation model; and  determining the pollution level by using a GWO-SVM model based on the basic data and the stability.

Further, on the one hand, the three-dimensional geological model, the tailings accumulation body model and the FLAC program are used to qualitatively evaluate the stability of the dam body of the tailings pond construction area, and on the other hand, the stability calculation model is used to quantitatively evaluate the stability of the dam body of the tailings pond construction area, the accuracy and reliability of the stability result are improved by comparison.

Optionally, the pre-judgment and warning module executes the following steps when running:

issuing a stability warning when the stability is less than a stability threshold; and  issuing a pollution warning when the pollution level is not less than an environmental pollution level threshold.

Further, the pollution level and stability are calculated in real time and alarms are given in time, which facilitates the relevant personnel to take timely countermeasures and reduce safety hazards.

Optionally, the stability calculation model satisfies the following relationship:

$$= \frac{\sum_{i=1}^{n}[(G_i\cos\alpha_i\tan\varphi_i + c_i l_i)(1 + \Pi_{i+1}^{n}\rho_{i+1})]}{\sum_{i=1}^{n}[(G_i\sin\alpha_i) \times (1 + \Pi_{i+1}^{n}\rho_{i+1})]}$$

wherein, S is the stability of the tailings accumulation body, $G_i$ is the gravity of an i-th soil bar in the tailings accumulation body, $\alpha_i$ is the value of an angle between a connecting line of a midpoint of a sliding surface of the i-th soil bar and the center of a circle corresponding to the sliding surface of the soil bar and a vertical line, $\varphi_i$ is the effective cohesion of a bottom surface of the i-th soil bar, $\rho_{i+1}$ is a moment correlation coefficient between the i-th soil bar and an i+1-th soil bar, n is the total number of soil bars, $c_i$ is the cohesion of the i-th soil bar, and $l_i$ is the length of the i-th soil bar along the sliding surface.

Further, the stability calculation model takes into account the interaction between soil bars through the moment correlation coefficient to improve the accuracy and reliability of the calculation result to some extent.

Optionally, the AI optimization module includes a third computer storage medium configured to analyze a suitable discharge mode of the tailings accumulation body, the third computer storage medium having a third computer program stored therein, and the third computer program executes the following steps when running:

acquiring a stability prediction value and a pollution level prediction value by using the AI calculation module based on a plurality of set optimized tailings accumulation body models; and  outputting the stability prediction value, the pollution level prediction value, and the corresponding optimal discharge mode when the stability prediction value is less than the stability threshold and the pollution level prediction value is less than the environmental pollution level threshold.

Further, the AI optimization module is configured to obtain the discharge mode with higher stability and lower pollution level of the tailings accumulation body, thereby reducing the potential safety hazards and environmental pollution in the tailings pond construction area.

BRIEF DESCRIPTION OF FIGURES

In order to more clearly explain the technical proposal of the embodiment of the present application, the accompanying drawings required to be used in the embodiment will be briefly described below. It will be understood that the following accompanying drawings only illustrate certain embodiments of the present application, and therefore should not be regarded as a limitation of scope. For those of ordinary skill in the art, other related accompanying drawings may be obtained from these accompanying drawings without exerting creative effort.

DETAILED DESCRIPTION

Specific embodiments of the present disclosure will be described in detail below, and it should be noted that the embodiments described herein are for illustration only, and are not intended to limit the present disclosure. In the following description, numerous specific details are set forth in order to provide a thorough understanding of the present disclosure. It will be apparent, however, to those of ordinary skill in the art that these specific details need not be employed to practice the present disclosure. In other instances, well-known circuits, software or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or sub-combinations in one or more embodiments or examples. In addition, those of ordinary skill in the art will appreciate that the figures provided herein are for illustrative purposes and that the figures are not necessarily drawn to scale.

It should be noted in advance that in an alternative embodiment, the same symbols or letters appearing in all formulas have the same meaning and value, except for an independent description.

Figure 1:
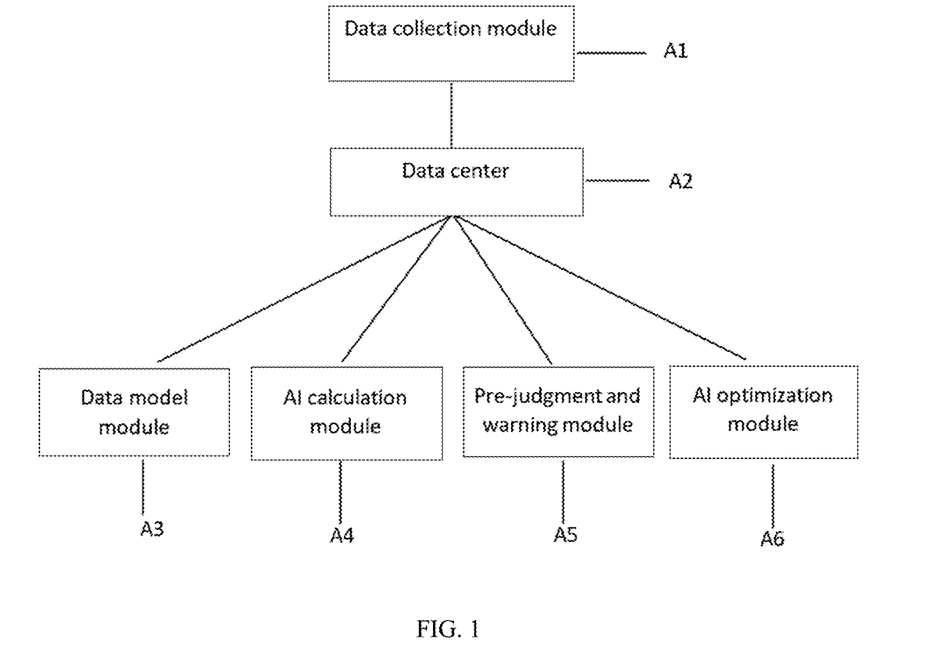
FIG. 1 is a framework schematic diagram illustrating a digital and intelligent operation and maintenance system for a tailings pond in accordance with an embodiment of the present disclosure.

In an alternative embodiment, referring to FIG. 1, the present disclosure provides a digital and intelligent operation and maintenance system for a tailings pond, and the system includes a data collection module A1, a data model module A3, an AI calculation module A4, a pre-judgment and warning module A5, an AI optimization module A6 and a data center A2.

The data collection module A1 is configured to collect basic data of a tailings pond construction area, and store the basic data in the data center A2; the data model module A3 is configured to construct a three-dimensional geological model of the tailings pond construction area and a tailings accumulation body model based on the basic data; the AI calculation module A4 is configured to calculate a pollution level of the tailings pond construction area and stability of the tailings accumulation body on the basis of the data model module A3; the pre-judgment and warning module A5 is configured to perform pollution warning by using the pollution level, and performs stability warning according to the stability; the AI optimization module A6 is configured to, on the basis of the data model module and the pre-judgment and warning module, analyze and output an optimal discharge mode of the tailings accumulation body according to a set optimized tailings accumulation body model; the data center A2 is configured to receive and store data generated by each module, and realize information sharing between the modules.

Specifically, in this embodiment, the basic data collected by the data collection module A1 includes topographic and geomorphological data, geological survey data, borehole data, an exploratory line profile, geophysical data, hydrological data, tailings accumulation body data, and environmental data of the tailings pond construction area. Wherein, the geological survey data includes stratum distribution, rock type and mineral distribution; the geophysical data includes information such as seismic wave velocity, resistivity and magnetic susceptibility; the hydrological data includes water table and permeability; the topographic and geomorphological data is DEM data; the tailings accumulation body data includes the height, width, shape, density of the tailings accumulation body, cohesion and friction angle of the soil bars; the environmental data is vegetation coverage, PM2.5 content and PM10 content. These data are not described in detail here, given that they can be obtained by conventional means.

Further, the data collection module A1 does not directly collect the basic data on site, and has a data entry function, and the basic data is collected by prior art means, inputted through a display screen on the data collection module A1, and transmitted by the data collection module A1 to the data center A2 through the Internet of Things for storage. In other optional embodiments, the data collection module A1 can also specifically have an online search function, that is, after determining the site of the tailings pond construction area, the data collection module A1 can query and screen out the historical basic data of the tailings pond construction area on the Internet, and store the historical basic data in the data center A2.

In an alternative embodiment, the data model module A3 generates a three-dimensional geological model and a tailings accumulation body model using the topographic and geomorphological data, geological survey data, borehole data, exploratory line profile, geophysical data, hydrological data, and tailings accumulation body data. Please refer to FIG. 2, the data model module A3 includes a tailings accumulation body model generation sub-module, an intermediary sub-module, a two-dimensional borehole generation sub-module, a two-dimensional profile generation sub-module, a geological plan generation sub-module, a contour data generation sub-module, a three-dimensional borehole generation sub-module, a three-dimensional cross-section generation sub-module, a geological profile generation sub-module, and a geological model generation sub-module.

Figure 2:
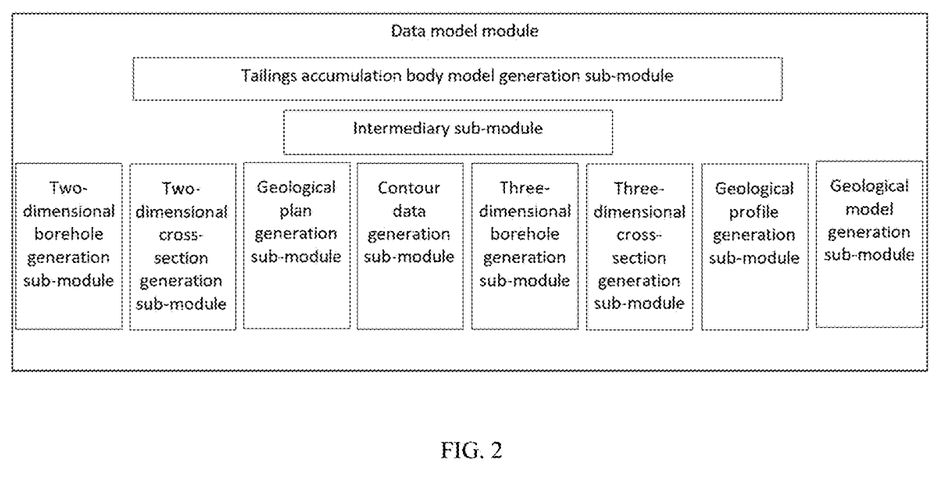
FIG. 2 is a framework schematic diagram illustrating a data model module in accordance with an embodiment of the present disclosure.

Specifically, in this embodiment, the tailings accumulation body model generation sub-module is configured to construct the tailings accumulation body model; the intermediary sub-module is configured to realize data interaction between other sub-modules of the data model module other than the tailings accumulation body model generation sub-module, thereby realizing data synchronization of two-dimensional data with three-dimensional data; the two-dimensional borehole generation sub-module is configured to generate two-dimensional borehole data required for constructing the three-dimensional geological model; the two-dimensional cross-section generation sub-module is configured to generate two-dimensional cross-section data required for constructing the three-dimensional geological model; the geological plan generation sub-module is configured to generate a geological plan required for constructing the three-dimensional geological model; the contour data generation sub-module is configured to generate contour data required for constructing the three-dimensional geological model; the three-dimensional borehole generation sub-module is configured to generate three-dimensional borehole data required for constructing the three-dimensional geological model; the three-dimensional cross-section generation sub-module is configured to generate three-dimensional cross-section data required for constructing the three-dimensional geological model; the geological profile generation sub-module is configured to generate a geological three-dimensional profile required for constructing the three-dimensional geological model; the geological model generating sub-module supplements the geologic three-dimensional profile according to the borehole data, resulting in the three-dimensional geological model.

Further, there is no direct data interaction between any two sub-modules such as the two-dimensional borehole generation sub-module, the two-dimensional cross-section generation sub-module, the geological plan generation sub-module, the contour data generation sub-module, the three-dimensional borehole generation sub-module, the three-dimensional cross-section generation sub-module, the geological profile generation sub-module and the geological model generation sub-module, instead, the interaction of data is enabled through the intermediary sub-module, for example, the geological profile generation sub-module, when constructing the geological three-dimensional profile, can invoke the three-dimensional borehole data generated by the three-dimensional borehole generation sub-module via the intermediary sub-module, this can simplify the interaction logic between different data in the data model module A3, drastically reduce the coupling between different modules, prevent the risk of variation of partial data from spreading to the global whole, thereby improving the efficiency of constructing the three-dimensional geological model. The functional implementation of each sub-module can be specifically referred to the prior art and will not be described in detail here.

More specifically, the geological model generation sub-module includes a first computer storage medium for generating the three-dimensional geological model, the first computer storage medium having stored therein a first computer program, the first computer program executes the following steps when running S1, a connected-layer genetic algorithm model is constructed for determining the connection mode between stratum boundary points revealed by different boreholes.

Wherein, S1 in particular includes the steps of:

S11, an initial population is generated by randomly generating chromosomes in accordance with all possible connection modes between the stratum boundary points.

In particular, in the present embodiment, the geological three-dimensional profile is generated to include the stratum information disclosed by the boreholes, and in order to more accurately correspond the stratum information disclosed by different boreholes, it is necessary to determine which stratums revealed by different boreholes are the same layer, and to connect the same stratums revealed by different boreholes.

More specifically, any point on a stratum boundary between two different adjacent stratums is taken as a stratum boundary point on the stratum. The initial population of the connected-layer genetic algorithm model is generated by taking all connection modes between the stratum boundary points revealed by all boreholes as sample data, which is known in the art and will not be described in detail here.

S12, fitness of each individual in the initial population is assessed.

In particular, in this embodiment, the fitness of the individual in the initial population satisfies the following relationship:

$$F_i(x) = \sum_{i=1}^{n}(f_i(x) \times a_i)$$

wherein, $F_i(x)$ is the fitness of the i-th individual, n is the number of evaluation indices, $f_i(x)$ is the evaluation function of the i-th evaluation index, and $a_i$ is the weight of the i-th evaluation index. The evaluation indices include the lithology, age, and cause of the stratum boundary revealed by the boreholes, i.e., n=3. $a_i$ is obtained by an expert evaluation method and indicates the proportion of each evaluation index when it is used to judge whether the stratum revealed by different boreholes is the same layer or not. In other alternative embodiments, other evaluation indices may also be included.

$f_i(x)$ satisfies the following relationship:

$$f_i(x) = (x_{i1} - x_{i2} + a)^{-1}$$

wherein, $X_{i1}$ is the evaluation index score for the stratum boundary point 1 under i evaluation indices; $X_{i2}$ is the evaluation index score for the stratum boundary point 2 under i evaluation indices, a is an adjustable parameter other than 0 to prevent the denominator from being 0 during the calculation, a=0.1 in this embodiment.

More specifically, the evaluation index score is a mathematical representation of the evaluation index used to reflect the stratum boundary points, and thus $f_i(x)$ can directly reflect the similarity degree of the i-th evaluation index of the stratum boundary point 1 and the stratum boundary point 2. The larger $f_i(x)$ is, the greater the similarity degree of the i-th evaluation index of the stratum boundary point 1 and the stratum boundary point 2 is; the smaller $f_i(x)$ is, the smaller the similarity degree of the i-th evaluation index of the stratum boundary point 1 and the stratum boundary point 2 is.

Furthermore, the lithology, age and cause of all stratum boundaries are inquired on the Internet at first, and the first, second and third arithmetic sequences are set up using positive integers. The items in the first, second and third arithmetic sequences are arranged in order from small to large. Therefore, according to the first arithmetic sequence, a real value can be attached to each kind of lithology as the evaluation index score of this kind of lithology, according to the second arithmetic sequence, a real value can be attached to each age as the evaluation index score of this age, and according to the third arithmetic sequence, a real value can be attached to a cause as the evaluation index score of this cause. In this way, when calculating the fitness, it is only necessary to directly select the corresponding evaluation index score according to the lithology, age and cause of the stratum boundary revealed by the boreholes. The first arithmetic sequence, the second arithmetic sequence and the third arithmetic sequence can be set according to the actual needs of the relevant personnel, and there is no restriction here.

Still further, in other alternative embodiments, the lithology, age, and cause of the stratum boundary revealed by the boreholes may be converted into a numerical form to predict the evaluation index score for each evaluation index using the RNN network.

S13, selection, crossover and mutation operations are sequentially performed on the population based on the set maximum number of evolutionary iterations and the fitness, and the individual with the maximum fitness is output.

S2, the geological three-dimensional profile is supplemented according to the connected-layer genetic algorithm model, thereby creating a three-dimensional geological model.

Wherein, S2 in particular includes the following steps:

S21, a connected-layer genetic algorithm model is utilized to obtain an optimal connection mode between stratum boundary points revealed by different boreholes.

S22, the stratum boundary points revealed by different boreholes are connected according to the optimal connection mode to supplement the geological three-dimensional profile, thereby creating a three-dimensional geological model.

Specifically, in this embodiment, the individual with the maximum fitness output in step S13 indicates that the connection mode between the two stratum boundary points included in the individual is the optimal connection mode. The contents of steps S12 and S13 are continuously executed by the initial population generated in step S11 to output an individual with the maximum fitness, and the two stratum boundary points included in the individual are linked each time an individual with the maximum fitness is output to indicate that the stratum boundary where the two stratum boundary points are located is the same stratum boundary, and this operation is repeated until a certain stratum boundary point connecting two different stratum boundary points begins to appear. Finally, a complete three-dimensional geological model can be obtained by connecting the stratum boundaries revealed by different boreholes according to the connection lines between the stratum boundary points.

Further, the geological three-dimensional profile is done first, the geological three-dimensional profile is then supplemented by the connected-layer genetic algorithm model to find the optimal connection solution between the stratum boundary points revealed by different boreholes, further, the three-dimensional geological model is established, which avoids forming the model first and then making gradual corrections to the model, omits subsequent tedious data processing, improves modeling efficiency and quality, and realizes forward construction of the three-dimensional geological model. Furthermore, based on the intermediary pattern, the subsequent modifications to the three-dimensional geological model are more accurate and convenient.

The connected-layer genetic algorithm model is used to find the optimal connection solution between the stratum boundary points revealed by different boreholes, thus improving the accuracy and reliability of the three-dimensional geological model.

In an optional embodiment, the AI calculation module A4 includes a second computer storage medium configured to calculate the stability of the tailings accumulation body, the second computer storage medium having a second computer program stored therein, the second computer program executes the following steps when running:

B1, according to the three-dimensional geological model, the tailings accumulation body model and the basic data, the stability of the tailings accumulation body is acquired by using a FLAC program and a stability calculation model.

Specifically, in this embodiment, the stability calculation model satisfies the following relationship:

$$S = \frac{\sum_{i=1}^{n}[(G_i\cos\alpha_i\tan\varphi_i + c_il_i)(1 + \Pi_{i+1}^n\rho_{i+1})]}{\sum_{i=1}^{n}[(G_i\sin\alpha_i) \times (1 + \Pi_{i+1}^n\rho_{i+1})]}$$

wherein, S is the stability of the tailings accumulation body, $G_i$ is the gravity of an i-th soil bar in the tailings accumulation body, $\alpha_i$ is the value of an angle between a connecting line of a midpoint of a sliding surface of the i-th soil bar and the center of a circle corresponding to the sliding surface of the soil bar and a vertical line, $\varphi_i$ is the effective cohesion of a bottom surface of the i-th soil bar, $\rho_{i+1}$ is a moment correlation coefficient between the i-th soil bar and an i+1-th soil bar, n is the total number of soil bars, $c_i$ is the cohesion of the i-th soil bar, and $l_i$ is the length of the i-th soil bar along the sliding surface.

Further, a FLAC software program is included in the AI calculation module A4, FLAC is a finite element analysis software for geotechnical engineering numerical simulation, on the one hand, the three-dimensional geological model, the tailings accumulation body model and the FLAC program are used to qualitatively evaluate the dam body stability in the tailings pond construction area, and on the other hand, the stability calculation model is used to qualitatively evaluate the dam body stability in the tailings pond construction area, the accuracy and reliability of the stability result are improved by comparison. In addition, the stability calculation model takes into account the interaction between the soil bars through the moment correlation coefficient, which improves the accuracy and reliability of the calculation result to some extent. Qualitative evaluation of dam body stability in the tailings pond construction area using three-dimensional geological model, the tailings accumulation body model and the FLAC program is an existing technology, and will not be described in detail here.

B2, the pollution level is determined by using a GWO-SVM model based on the basic data and the stability.

Specifically, in this embodiment, the GWO-SVM model is constructed based on the GWO-SVM algorithm, and is trained using the environmental data, stability and pollution level. Wherein, the GWO-SVM model input is the environmental data and stability, and output is the pollution level. The environmental data, stability and pollution level for training the GWO-SVM model are available from the prior art, and the GWO-SVM model is also known in the art and will not be described in detail here.

Further, the GWO-SVM model has higher prediction accuracy, the pollution level of the tailings pond construction area can be accurately predicted, and since the stability of the tailings accumulation body is used in predicting the pollution level, the obtained pollution level also has a predictive effect on the future environmental changes of the tailings pond construction area, which is conducive to the relevant personnel to take prevention and control measures to reduce potential safety hazards. In other alternative embodiments, to further improve the accuracy of the pollution level, more types of data may be used as input to the GWO-SVM model, such as hydrological data.

In an alternative embodiment, the pre-judgment and warning module A5 executes the following steps when running:

C1, a stability warning is issued when the stability is less than a stability threshold.

C2, a pollution warning is issued when the pollution level is not less than an environmental pollution level threshold.

Specifically, in this embodiment, the stability threshold is set to 1, and the environmental pollution level threshold is set to 2. By setting the stability threshold and the environmental pollution level threshold, the stability warning and pollution warning are issued in time according to the actual situation of the tailings pond construction area, and the relevant personnel are reminded to take prevention and control measures in time, so as to reduce the potential safety hazards and environmental pollution in the tailings pond construction area.

In an optional embodiment, the AI optimization module A6 includes a third computer storage medium configured to analyze a suitable discharge mode of the tailings accumulation body, the third computer storage medium having a third computer program stored therein, and the third computer program executes the following steps when running:

D1, a stability prediction value and a pollution level prediction value are acquired by using the AI calculation module based on a plurality of set optimized tailings accumulation body models.

Specifically, in this embodiment, the AI optimization module A6 includes a display screen and Geomaterials Studio software. When the pre-judgement and warning module A5 issues a stability warning, relevant personnel design a plurality of optimized tailings accumulation body models on the display screen of the AI optimization module A6 based on the three-dimensional geological model and the tailings accumulation body model using the Geomaterials Studio software, and then the AI optimization module A6 shares the obtained optimized tailings accumulation body model to the AI computing module A4 through the data center A2. This is prior art and will not be described in detail here.

Further, the AI calculation module A4 acquires the stability prediction value and the pollution level prediction value of the corresponding tailings accumulation body using the optimized tailings accumulation body model. The specific acquisition method can refer to steps B1 and B2. When calculating the stability prediction value, the original soil bar division method, the density of each soil bar in the tailings accumulation body, and the cohesion and friction angle of each soil bar are kept unchanged. Because the density of each soil bar in the tailings accumulation body is invariable, the width of the tailings accumulation body is taken as the height of each soil bar in the optimized tailings accumulation body model, so the gravity of each soil bar can be equivalent to the bottom area of each soil bar in the optimized tailings accumulation body model. Because the corresponding scale is attached in the optimized tailings accumulation body model, it is easy to calculate the bottom area of each soil bar in the optimized tailings accumulation body model, and then calculate the stability of the tailings accumulation body in the optimized tailings accumulation body model, that is, the stability prediction value.

D2, the stability prediction value, the pollution level prediction value, and the corresponding optimal discharge mode are output when the stability prediction value is less than the stability threshold and the pollution level prediction value is less than the environmental pollution level threshold.

Specifically, in this embodiment, the optimal discharge mode output by the AI optimization module A6 is the optimal optimized tailings accumulation body model, and the AI optimization module is used to obtain the discharge mode with higher stability and lower pollution level of the tailings accumulation body, thereby reducing the potential safety hazards and environmental pollution in the tailings pond construction area.

It should be noted that in some cases, the actions described in the specification can be performed in a different order and still achieve desirable results. In the present embodiment, the order of steps is presented merely to make the embodiment more clear, for ease of illustration, rather than to limit it.

In summary, the system provided by the present disclosure uses the data model module, the AI calculation module, the pre-judgement and warning module and the AI optimization module to complete the stability evaluation and warning of the tailings accumulation body, the pollution level determination of the surrounding environment and the tailings accumulation body accumulation solution optimization, which has a better auxiliary effect on the operation and maintenance of the tailings pond, thus improving the operation and maintenance efficiency of the tailings pond, and being conducive to reducing the potential safety hazards in the operation process of the tailings pond and protecting the natural environment around the tailings pond.

Finally, it should be noted that the above embodiments are only intended to illustrate the technical solution of the present disclosure, but not to limit it; although the present disclosure has been described in detail with reference to the foregoing embodiments, it will be understood by those skilled in the art that modifications may be made to or equivalents may be substituted for some or all of the technical features described in the foregoing embodiments; however, these modifications or substitutions, which do not depart the essence of the corresponding technical solutions from the scope of the embodiments of the present disclosure, shall be covered in the claims and the description of the present disclosure.

What is claimed is:

1. A digital and intelligent operation and maintenance system for a tailings pond, comprising:
a data collection module, a data model module, an AI calculation module, a pre-judgment and warning module, an AI optimization module and a data center; wherein
the data collection module is configured to collect basic data of a tailings pond construction area, and store the basic data in the data center;
the data model module constructs a three-dimensional geological model of the tailings pond construction area and a tailings accumulation body model based on the basic data, the data model module comprising:
a two-dimensional borehole generation sub-module, configured to generate two-dimensional borehole data required for constructing the three-dimensional geological model;
a two-dimensional cross-section generation sub-module, configured to generate two-dimensional cross-section data required for constructing the three-dimensional geological model;
a geological plan generation sub-module, configured to generate a geological plan required for constructing the three-dimensional geological model;
a contour data generation sub-module, configured to generate contour data required for constructing the three-dimensional geological model;

a three-dimensional borehole generation sub-module, configured to generate three-dimensional borehole data required for constructing the three-dimensional geological model;

a three-dimensional cross-section generation sub-module, configured to generate three-dimensional cross-section data required for constructing the three-dimensional geological model;

a geological profile generation sub-module, configured to generate a geological three-dimensional profile required for constructing the three-dimensional geological model; and a geological model generation sub-module, wherein the geological model generation sub-module supplements the geological three-dimensional profile according to the borehole data to obtain the three-dimensional geological model, the geological model generation sub-module comprises a first computer storage medium configured to generate the three-dimensional geological model, the first computer storage medium having a first computer program stored therein, and the first computer program executes the following steps when running:

generating an initial population by randomly generating chromosomes in accordance with all possible connection modes between stratum boundary points;

assessing fitness of each individual in the initial population;

sequentially performing selection, crossover and mutation operations on the population based on the set maximum number of evolutionary iterations and the fitness, and outputting the individual with the maximum fitness;

utilizing a connected-layer genetic algorithm model to obtain an optimal connection mode between stratum boundary points revealed by different boreholes; and connecting the stratum boundary points revealed by different boreholes according to the optimal connection mode to supplement the geological three-dimensional profile, thereby creating a three-dimensional geological model;

a tailings accumulation body model generation sub-module, configured to construct the tailings accumulation body model; and an intermediary sub-module, configured to realize data interaction between other sub-modules of the data model module other than the tailings accumulation body model generation sub-module, thereby realizing data synchronization of two-dimensional data with three-dimensional data; and the AI calculation module is configured to calculate a pollution level of the tailings pond construction area and stability of the tailings accumulation body on the basis of the data model module, the AI calculation module comprises a second computer storage medium configured to calculate the stability of the tailings accumulation body, the second computer storage medium having a second computer program stored therein, and the second computer program executes the following steps when running:

according to the three-dimensional geological model, the tailings accumulation body model and the basic data, acquiring the stability of the tailings accumulation body by using a FLAC program and a stability calculation model, the stability calculation model satisfying the following relationship:

$$S = \frac{\sum_{i=1}^{n}[(G_i\cos\alpha_i\tan\varphi_i + c_i l_i)(1 + \Pi_{i+1}^{n}\rho_{i+1})]}{\sum_{i=1}^{n}[(G_i\sin\alpha_i) \times (1 + \Pi_{i+1}^{n}\rho_{i+1})]},$$

wherein, $S$ is the stability of the tailings accumulation body, $G_i$ is the gravity of an i-th soil bar in the tailings accumulation body, $\alpha^1$ is the value of an angle between a connecting line of a midpoint of a sliding surface of the i-th soil bar and the center of a circle corresponding to the sliding surface of the soil bar and a vertical line, $\varphi_i$ is the effective cohesion of a bottom surface of the i-th soil bar, $\rho_{i+1}$ is a moment correlation coefficient between the i-th soil bar and an i+1-th soil bar, n is the total number of soil bars, $c_i$ is the cohesion of the i-th soil bar, and $l_i$ is the length of the i-th soil bar along the sliding surface; and determining the pollution level by using a GWO-SVM model based on the basic data and the stability;

the pre-judgment and warning module performs pollution warning by using the pollution level, and performs stability warning according to the stability;

the AI optimization module is configured to, on the basis of the data model module and the pre-judgment and warning module, analyze and output an optimal discharge mode of the tailings accumulation body according to a set optimized tailings accumulation body model, and discharge according to the optimal discharge mode; and the data center is configured to receive and store data generated by each module, and realize information sharing between the modules.

2. The digital and intelligent operation and maintenance system for a tailings pond according to claim 1, wherein:
the basic data comprises topographic and geomorphological data, geological survey data, borehole data, an exploratory line profile, geophysical data, hydrological data, tailings accumulation body data, and environmental data of the tailings pond construction area.

3. The digital and intelligent operation and maintenance system for a tailings pond according to claim 2, wherein the pre-judgment and warning module executes the following steps when running:
issuing a stability warning when the stability is less than a stability threshold; and
issuing a pollution warning when the pollution level is not less than an environmental pollution level threshold.

4. The digital and intelligent operation and maintenance system for a tailings pond according to claim 3, wherein the AI optimization module comprises a third computer storage medium configured to analyze a suitable discharge mode of the tailings accumulation body, the third computer storage medium having a third computer program stored therein, and the third computer program executes the following steps when running:
acquiring a stability prediction value and a pollution level prediction value by using the AI calculation module based on a plurality of set optimized tailings accumulation body models; and
outputting the stability prediction value, the pollution level prediction value, and the corresponding optimal discharge mode when the stability prediction value is less than the stability threshold and the pollution level prediction value is less than the environmental pollution level threshold.

* * * * *